United States Patent [19]

Remes et al.

[11] Patent Number: 4,548,335

[45] Date of Patent: Oct. 22, 1985

[54] LIQUID CONTAINER

[75] Inventors: R. Scott Remes, Prior Lake; Paul J. Thompson, Minneapolis, both of Minn.

[73] Assignee: Minnesota Valley Engineering, Inc., New Prague, Minn.

[21] Appl. No.: 392,022

[22] Filed: Jun. 25, 1982

[51] Int. Cl.$^4$ .............................................. B65D 90/22
[52] U.S. Cl. ...................................... 220/466; 220/446
[58] Field of Search .................. 62/50; 220/466, 446, 220/447, 437

[56] References Cited

U.S. PATENT DOCUMENTS

| | | | |
|---|---|---|---|
| 883,479 | 3/1908 | Place . | |
| 1,598,149 | 8/1926 | Mott | 220/439 X |
| 1,940,277 | 12/1933 | Stresau | 220/437 X |
| 2,116,795 | 5/1938 | Lee | 220/466 X |
| 2,301,075 | 11/1942 | Nyberg | 220/466 X |
| 2,624,451 | 1/1953 | Ewing | 220/466 X |
| 2,951,348 | 9/1960 | Loveday et al. | 62/50 |
| 3,347,402 | 10/1967 | Forman et al. | 220/437 X |
| 3,414,155 | 12/1968 | Corvino . | |
| 3,425,585 | 2/1969 | Latham | 220/437 |
| 3,787,279 | 1/1974 | Winchester | 161/160 |
| 4,308,967 | 1/1982 | Vater et al. | 220/439 X |

Primary Examiner—Stephen Marcus
Assistant Examiner—Robert Petrik
Attorney, Agent, or Firm—McDougall, Hersh & Scott

[57] ABSTRACT

A container for the storage of liquids at temperatures that deviate widely from ambient temperature in which the container is formed with an outer vessel and an inner vessel supported by a neck tube from the outer vessel and which includes an annular ring member spanning the space between the outer and inner vessels adjacent their upper ends to stabilize the inner vessel within the outer vessel.

9 Claims, 5 Drawing Figures

LIQUID CONTAINER

This invention relates to a double walled container having a space between the inner and outer shell walls adapted to be filled with insulation material.

While the invention will be described with reference to a container adapted to housing a low boiling liquefied gas, such as helium, nitrogen, argon, hydrogen, oxygen and the like, it will be understood that the container of this invention finds utilization in the storage and transportation of other low boiling liquefied gases such as liquefied neon, liquid natural gas, ammonia, carbon dioxide, nitrous oxide and the like, or for use with fluids at high temperatures, such as in the storage or transportation of molten metal, or in the housing of sodium or potassium for power cell conversion, and the like.

In general, such containers are formed with an inner vessel for housing the liquefied gas and an outer vessel which surrounds the inner vessel with a spaced relation in between to provide an intervening space which is preferably, though not necessarily, maintained under vacuum and filled with a super-insulation system, such as described in U.S. Pat. No. 3,866,785.

A fluid conduit in the form of a neck tube extends vertically from the inner vessel through the top of the outer vessel for communication with the interior of the inner vessel to enable the passage of liquid and gases into and out of the container. The neck tube serves to support the inner vessel within the outer vessel.

In the construction described, utilization is made of neck tubes of relatively thin metal members with the intent of reducing heat-inleak, but at the expense of structural integrity and ability to sustain lateral impact loads. As a result, the neck tube is subject to permanent deformation in response to forces operating when the container tips over or is otherwise severely jarred. Experience has also shown that such tipping and/or jarring forces sometimes cause the inner vessel to impact the outer vessel in a manner to damage tubing provided between the vessels and essential to the operation of the container.

It is an object of this invention to provide a double walled container of large capacity which is characterized by structural strength and sufficient stability to withstand damage resulting from tipping, jarring, impact, or the like, and it is a related object to produce a double walled insulated container of large capacity for the storage and shipment of cryogenic liquids whereby structural strength and stability are important factors in the commercial utilization of such containers.

These and other objects and advantages of this invention will hereinafter appear and, for purposes of illustration but not of limitation, an embodiment of the invention is shown in the accompanying drawings in which FIG. 1 is a schematic sectional elevational view of a double walled insulated container embodying the features of this invention;

Figure 1:
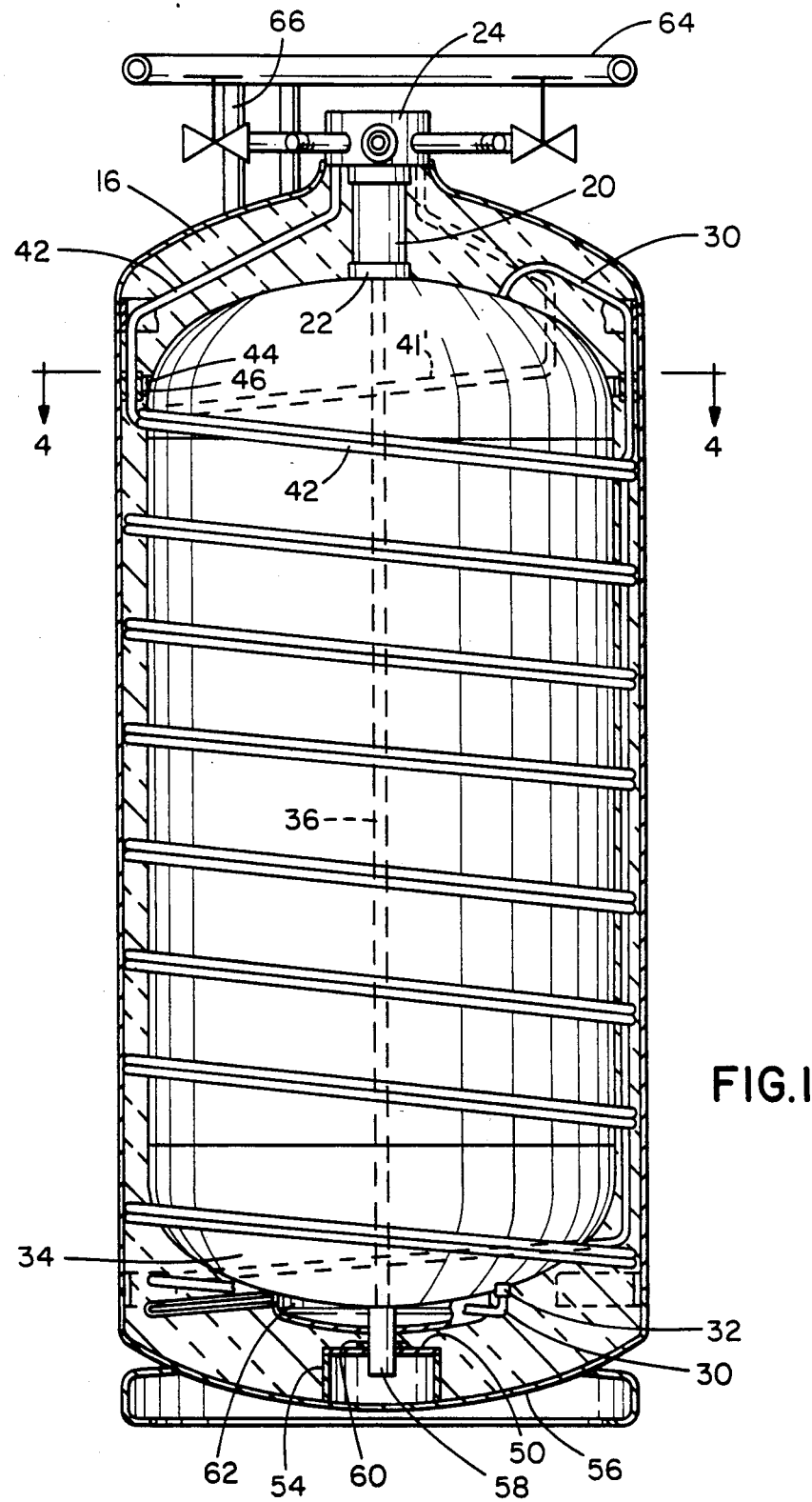
Figure 2:
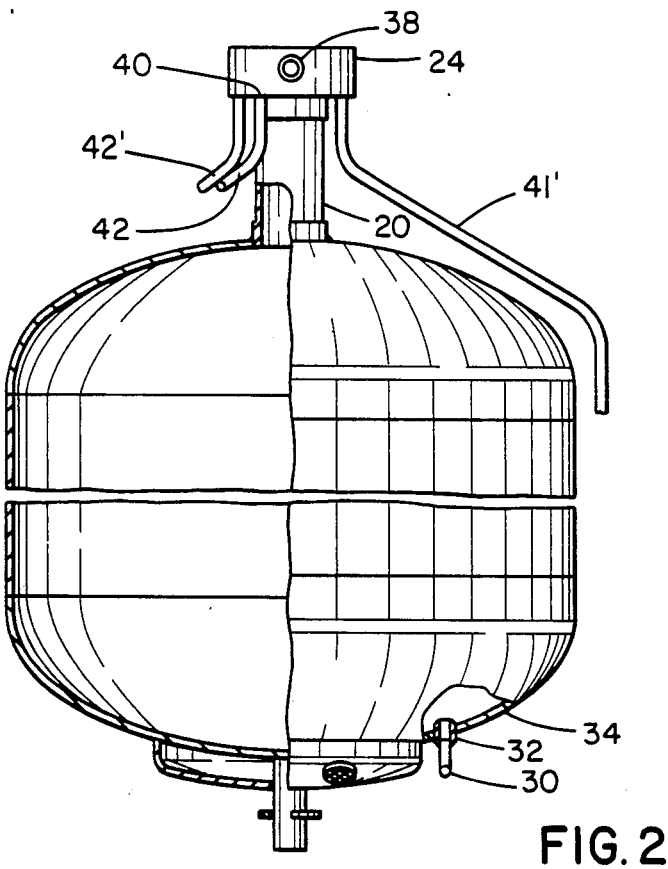
FIG. 2 is an elevational view of the inner vessel shown in FIG. 1.
Figure 3:
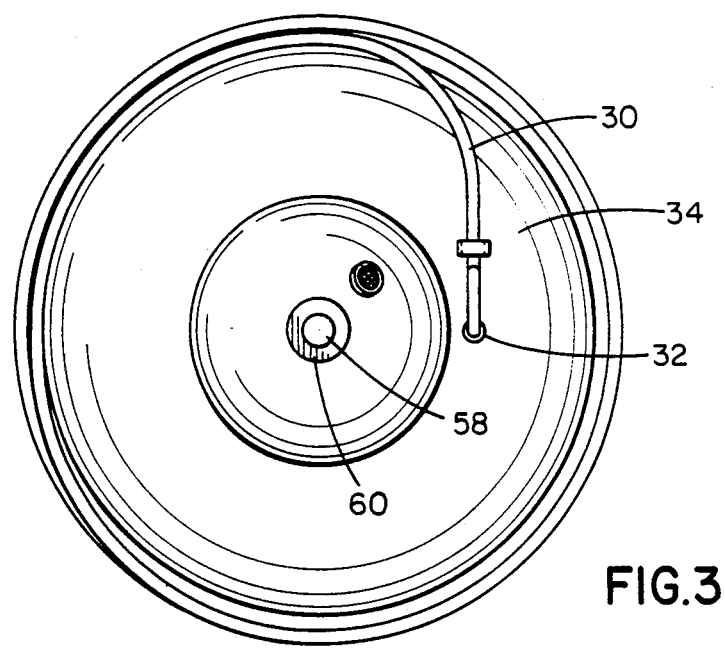
FIG. 3 is a view of the bottom side of the inner vessel shown in FIG. 3.
Figure 4:
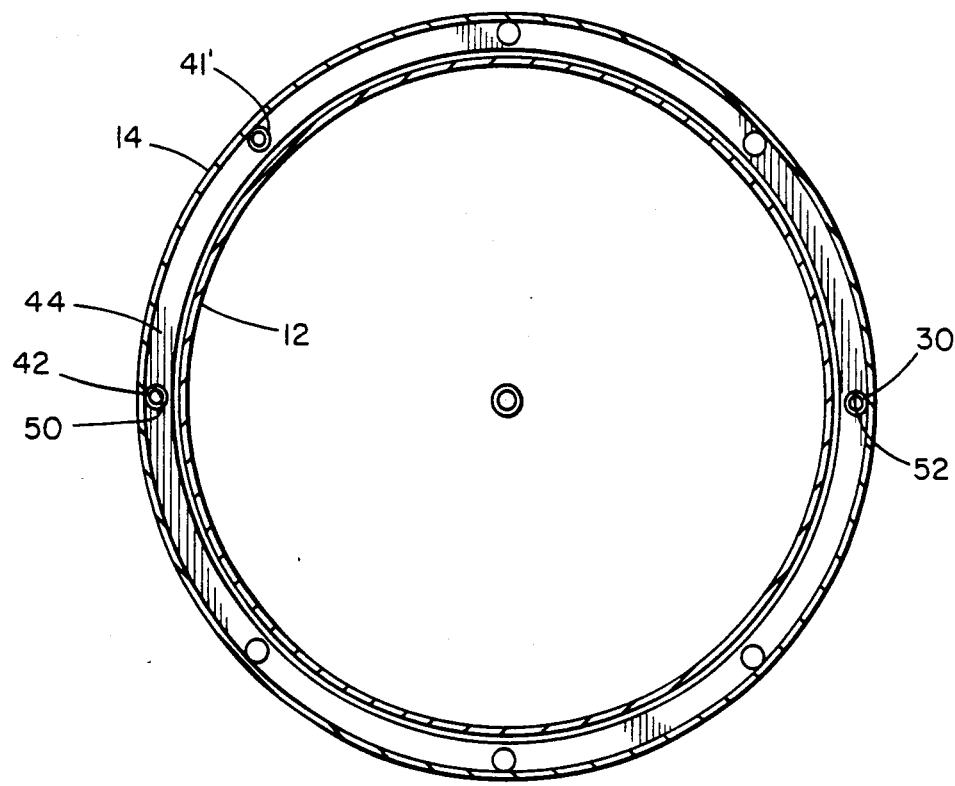
FIG. 4 is a sectional view taken along the line 4—4 of FIG. 1.
Figure 5:
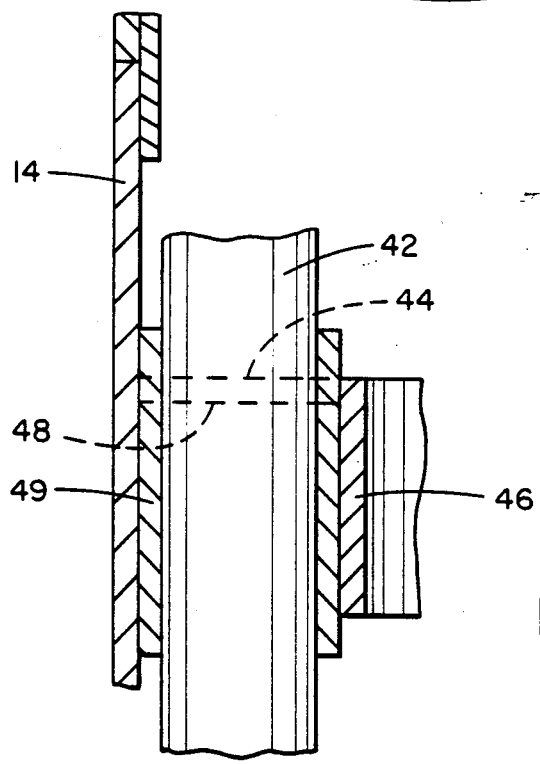
FIG. 5 is an enlarged sectional view taken along the line 5—5 of FIG. 1.

Referring now to the drawings, a double walled insulated container for use with cryogenic materials is constructed, in accordance with the practice of this invention, of an inner vessel 12 and an outer vessel 14 with an insulation space 16 in between. When used as a container of large capacity for housing cryogenic material, such as liquefied gas, the space 16 is evacuated and filled with a super-insulation 18 as described in the aforementioned patent.

The inner vessel 12 is supported within the outer vessel 14 by a neck tube 20 which extends from an opening 22 in the top of the inner vessel 12, through the top of the outer vessel 14 to enable passage of liquids and gas through the neck tube for the filling of the inner vessel or removal of gases or liquids therefrom. The upper end portion of the neck tube 20 extends from a header 24 which is received in fitting relation in the opening in the upper end of the outer vessel 14.

Utilization is made of a tubing 30, preferably formed of copper or other metal, which extends from an outlet 32 in the bottom wall 34 of the inner vessel 12, through the insulated space 16 between the vessel 12 and 14, to an inlet in the top wall through the header 24 of the inner vessel for communication with the vapor space in the upper portion of the inner vessel. Such communication between the liquid phase at the bottom of the vessel and the vapor phase at the top provides for self pressurization and equalization to provide the pressurization utilized for dispensing liquid or gas from the container. In the preferred arrangement, the tubing 30 extends upwardly through the space immediately adjacent the wall of the outer vessel to maximize heat transfer thereto.

Liquid is dispensed from the inner vessel through a dip tube 36 which extends from the bottom of the inner vessel through the neck tube 20 to the header 24. Valving (not shown) is provided to direct the liquid through port 38 for delivery of the liquid directly in its liquid phase or to outlets 40 to one or more tubings 42, preferably in the form of copper tubing, spirally wound, or otherwise, through the space 16 between the inner and outer vessels for conversion of the liquid phase to the gaseous phase and return through spirally wound tubing 41' to the header for delivery of the gasified liquid. For this purpose, it is desirable to arrange the tubing 42 immediately adjacent the outer vessel for maximization of heat transfer to the liquid for conversion of the liquid to the vapor phase.

It has been found that the neck tube 20 can become permanently deformed when the container tips over, with the result that the container thereafter becomes unfit for future use.

Relative movement between the inner and outer vessels, during such tip-over accident, or in response to jarring impact, often causes the inner vessel to smash against the outer vessel, with corresponding damage to the tubing between the vessels, which tubing, as described, is vital to the operation of the container.

The improvement whereby the described undesirable features are overcome resides in the construction of the outer vessel 14 with a ring member 44 extending inwardly from an upper end portion of the inner wall of the outer vessel for a distance which is slightly less (0.1-1.0 inch) than the spaced relation between the inner wall of the outer vessel and the outer wall of the inner vessel at corresponding levels whereby the ring member 44 spans the space between the outer and inner vessels but is just short of actual contact with the outer wall of the inner vessel thereby to limit relative radial movement therebetween, at the upper end portion of the vessels.

The ring member 44 is preferably in the form of a steel ring, but may be formed of other dimensionally stable, structurally strong material, such as aluminum, nickel, iron, and alloys thereof, or even of wood or the like structurally stable material. In the preferred practice of the invention, the ring member 44 is formed with a downwardly extending annular flange 46, such as in the form of a right angle, to provide additional strength and rigidity and to provide a surface area for engagement with the inner vessel upon impact, thereby to spread the load. The rolled angle 46 is spaced from the inner wall of the outer vessel 14 by an amount greater than the cross section of the copper tubing and the horizontally disposed portion 48 of the ring member 44 is provided with notches or openings 50 and 52 to enable the copper tubing 30 and 42 to pass between the rolled angle 46 and the inner wall of the outer vessel and through the openings in the ring member. Thus the tubings are protected by the ring member from engagement by the inner vessel thereby to avoid damage of the tubing and interference with the efficient operation of the container. The ring member is preferably formed with additional openings 52' or passages for increasing the communication between the portions of the space 16 intersected by the ring member for equalization of pressures therebetween.

In the preferred practice of this invention, the portions of the tubings passing through the openings in the ring member are further protected by a sleeve section 49 secured in fitting relation about the through extending portion of the tubing.

To prevent or otherwise minimize damage, as by distortion of the neck tube in response to tipping of the container, it is important to locate the ring member 44 alongside the upper end portion of the side wall of the inner vessel, but out of direct contact therewith. Thus the inner vessel is stabilized against movement relative to the outer vessel thereby to retain alignment of the inner vessel within the outer vessel and prevent deformation of the neck tube beyond safe limits.

It is sufficient to make use of a single protective ring 44 of the type described, although more than one ring in vertically spaced apart relation may be employed to achieve still further stabilization. By way of further modification, instead of making use of a continuous protective ring 44 encircling the vessels, use can be made of a plurality of circumferentially spaced apart abutments encircling the vessels as a ring member.

Though not essential, it is preferred to include a platform 50 secured to the bottom wall 56 of the outer vessel and supported by tube 54 in vertically spaced apart relation from the bottom wall. The platform is provided with an opening aligned with the center of the inner vessel 12 for enabling a centering pin 58, dimensioned to have a length less than the spaced relation between the platform and the adjacent bottom wall of the outer vessel, to extend from the bottom side of the inner vessel through the opening for axial movement relative thereto. This operates not only to stabilize the lower end portion of the inner vessel against lateral loading in cooperation with the ring member 44 at the top, but it also provides bottom support for the inner vessel while enabling relative vertical movement in response to expansion and contraction of the inner vessel suspended from the neck tube 20. The top side of the platform 50 is provided with a padding 60 on which the inner vessel rests when the bottom support is utilized when the vessel is dropped vertically.

In the illustrated modification, the space 62 adjacent the bottom side of the inner vessel is filled with a getter for removal of undesirable elements in the insulated space.

Although it is preferred to have the ring member extend from the inner wall of the outer vessel, the ring member can instead be constructed as a part of the inner vessel to extend from the inner vessel in the direction towards the inner wall of the outer vessel with the notches or openings provided in the outer portions of the ring member closely adjacent the inner wall of the outer vessel.

As used herein, the term "container of large capacity" is meant to refer to a container having a capacity of more than 10 liters and preferably more than 120 liters of liquid. The inner vessel is preferably formed of metal which is not subject to embrittlement at low cryogenic temperatures, such as of nickel steel, chromium steel, aluminum and the like, while the outer vessel, which is normally out of contact with the cold liquid and is often at ambient temperature, can be formed of steel or any metal having the desired structural strength.

The doughnut 64 surrounding the header and rigidly secured by brace members 66 to the top wall of the outer vessel, serves as a hand holder for carrying the container or for rolling the container from one station to another.

It will be understood that changes may be made in the details of construction, arrangement and operation, without departing from the spirit of the invention, especially as defined in the following claims.

I claim:

1. In a container for housing a liquid at temperatures which deviate greatly from normal comprising an inner vessel having top and bottom walls and vertically disposed side walls, an outer vessel enclosing the inner vessel and in spaced relation therewith to provide an insulated space therebetween, and an elongate neck tube extending from the top wall of the inner vessel to the top wall of the outer vessel to support the inner vessel therefrom, the improvement comprising an abutment extending inwardly from the inner wall of the outer vessel substantially across the space between the outer and inner vessels adjacent the upper end portions of the side walls thereof, but short of direct contact with the inner vessel to protect said neck tube by limiting movement of the inner vessel relative to the outer vessel during dymanic impacts resulting from tipovers or dropping.

2. A container as claimed in claim 1 in which the abutment is in the form of a ring member extending inwardly from the inner wall of the outer vessel for a distance to terminate immediately adjacent the side wall of the inner vessel.

3. A container as claimed in claim 2 in which the ring member includes an annular flange depending from the inner edge thereof.

4. A container as claimed in claim 3 in which the annular flange is a rolled angle depending from the ring member.

5. A container as claimed in claim 1 which further includes tubing extending through the space between the inner and outer vessels and in which the ring member includes openings through which the tubing extends for protection by the ring member.

6. A container as claimed in claim 5 which includes passages through the ring member in addition to the openings for equalization of pressures in the space between the inner and outer vessels on each side of the ring member.

7. A container as claimed in claim 1 which includes a bottom support in the form of a platform secured in spaced relation from the bottom wall of the outer vessel having an opening extending therethrough in alignment with the center of the inner vessel and a pin extending downwardly from the center of the bottom wall of the inner vessel and through said opening.

8. A container as claimed in claim 7 in which the pin is dimensioned to have a length less than the spaced relation between the platform and the adjacent bottom wall of the outer vessel to enable relative movement between the pin and platform in response to expansions and contractions of the inner vessel which stabilizes the inner vessel against lateral loading.

9. In a container for housing a liquid at temperatures which deviate greatly from normal comprising an inner vessel having top and bottom walls and vertically disposed side walls, an outer vessel enclosing the inner vessel and in spaced relation therewith to provide an insulated space therebetween, and an elongate neck tube extending from the top wall of the inner vessel to the top wall of the outer vessel to support the inner vessel therefrom, the improvement comprising an abutment extending inwardly from the inner wall of the outer vessel substantially across the space between the outer and inner vessels adjacent the upper portions thereof, but short of direct contact with the inner vessel to protect said neck tube by limiting movement of the inner vessel relative to the outer vessel during dynamic impacts resulting from tipovers or dropping.

* * * * *